United States Patent

Scala et al.

[15] 3,676,383

[45] July 11, 1972

[54] NON-AQUEOUS ELECTROPHORETIC COMPOSITIONS COMPRISING LIQUID NITROALKANES AS A SOLVENT

[72] Inventors: Luciano C. Scala; Wilford O. Bartlett, both of Murrysville, Pa.

[73] Assignee: Westinghouse Electric Corporation, Pittsburgh, Pa.

[22] Filed: Dec. 19, 1969

[21] Appl. No.: 886,778

Related U.S. Application Data

[63] Continuation-in-part of Ser. No. 661,687, Aug. 18, 1967, abandoned.

[52] U.S. Cl..................260/22 R, 117/128.4, 117/161 K, 117/161 P, 204/181, 260/32.4, 260/37 N, 260/40 R
[51] Int. Cl....................C09d 3/64, C09d 5/24, C23b 13/00
[58] Field of Search...............260/22 R, 32.4, 37 N; 204/181

[56] References Cited

UNITED STATES PATENTS

| 2,843,541 | 7/1958 | Senderoff et al. | 204/181 |
| 2,947,677 | 8/1960 | Blickwedel | 204/181 |
| 2,982,707 | 5/1961 | Scheible | 204/181 |
| 3,093,511 | 6/1963 | Weisel et al. | 204/181 |
| 3,450,655 | 6/1969 | Spiller | 260/22 |
| 3,554,984 | 1/1971 | George | 260/32.4 |

*Primary Examiner*—Donald E. Czaja
*Assistant Examiner*—Ronald W. Griffin
*Attorney*—F. Shapoe and L. P. Johns

[57] ABSTRACT

A process for the electrophoretic coating or repair of flaws in insulation of electrical components which employs non-aqueous solutions comprising liquid nitroalkanes as a solvent, consisting essentially of a resin dissolved in the solvent together with surface active agents, and desirably containing small amounts of a finely divided inorganic filler, to provide improved coverage on sharp edges of members being coated. The electrophoretically applied coating is then heat treated.

5 Claims, 4 Drawing Figures

PATENTED JUL 11 1972          3,676,383

WITNESSES

INVENTORS
Luciano C. Scala &
Wilford O. Bartlett
BY
ATTORNEY

3,676,383

NON-AQUEOUS ELECTROPHORETIC COMPOSITIONS COMPRISING LIQUID NITROALKANES AS A SOLVENT

CROSS-REFERENCE TO RELATED APPLICATIONS

This application is a continuation-in-part of copending application Ser. No. 661,687, filed Aug. 18, 1967, now abandoned.

BACKGROUND OF THE INVENTION

1. Field of the Invention

This invention relates to a coating system for use in the electrophoretic deposition of resinous coatings on metallic substrates.

2. Description of the Prior Art

When a direct current potential is applied across an emulsion, suspension or solution containing charged particles or molecules, the latter migrate toward the electrode bearing the opposite charge. This phenomenon is generally called electrophoresis and is utilized to apply coatings onto metallic surfaces for purposes of electrical insulation, paint priming, weather protection, and the like.

Most of the electrophoretic deposition techniques followed in industry involve aqueous systems. However, aqueous depositions are in general markedly affected and vitiated by the evolution of gases at the electrodes. This gas evolution, deriving from water electrolysis, often interferes with film formation at the electrode by rupturing and dislodging the previously applied deposit. Moreover, water emulsion systems are generally plagued by difficult-to-control surface tension, necessary pH conditions, and viscosity difficulties. Water soluble systems are also limited by the relatively small number of useful water soluble resins. The systems in which the fluid medium is an organic liquid of sufficient conductivity were preferable even though the voltages required were higher than those involved in aqueous systems.

Although most of the electrophoretic deposition techniques applied in industry involve aqueous processes, a few organic systems, such as that shown in U.S. Pat. No. 2,982,707, are also being used. However, the majority of known organic systems do not solve one of the most difficult problems inherent to resin solutions; that is, the tendency of a deposited solvent-resin film to withdraw from areas of certain types of geometry because of the action of surface tension, before the said film is insolubilized by the curing or setting-up step. An example of this behavior is given by the withdrawal of a resin solution from the edges of aluminum or copper foil conductor prior to heat curing. Withdrawal of this type exposes the metal edges and, therefore, limits the insulation characteristics and increases the chances of short circuits and electrical breakdown. The deleterious effects of this behavior are enhanced by the presence on the edges of the aluminum or copper foil of rough or jagged portions, splinters and metal dust.

Similar behavior can be expected where there is base metal exposed and where the compatibility (or wettability) between resin solution and base metal is low. An example of this behavior is evidenced by flaws introduced in the organic insulation (enamel) of conductor wires during the operation of winding enameled wire into coils, inductor slots, and the like. Abrasion, stretching, bending, all tend to crack or otherwise damage the electrical insulation forming the enameled conductor wire. For some applications a small number of such flaws is allowable, but, where the electrical machine is to be used in conditions of high humidity or submerged in water, such cracks would very quickly set up conditions of short circuiting or electrical breakdown. Here too, treatment of such semifinished parts with resin solutions would often result in the resin solution not wetting its base, exposed metal under the enamel, and in the withdrawing of the healing solution away from the exposed conducting metal.

U.S. Pat. No. 2,947,677 discloses the use of a suspension for electrophoretically coating essentially only particles of inorganic compounds on a metal base. The suspension comprises alkaline earth carbonates and alkaline earth nitrates suspended in a solution of a polymethacrylate dissolved in a non-polar organic solvent. Such a composition has the disadvantage of low conductivity requiring large current densities and high voltages i.e. 500 to 5,000 volts, which are hazardous both with respect to the electrical danger and fire hazard, and which also are costly, to obtain suitable coatings. Little if any of the resin is deposited with the filler particles.

U.S. Pat. No. 3,093,511 discloses aqueous suspensions of coating compositions for electrophoretic deposition. Inasmuch as the coating composition is an emulsion in water, it involves all the aforementioned problems inherent in aqueous solutions such as gas evolution at the electrodes. However, the primary shortcoming of aqueous suspensions is their low efficiency and continuous close control of pH is necessary.

U.S. Pat. No. 3,450,655 discloses a suspension for electrophoretically coating articles which is a suspension of a resin in an organic dielectric non-solvent such as xylene or aromatic hydrocarbons, which suspension results in the deposition of particles or globules of resin that must be coalesced after the solvent is evaporated. Thus, the resulting coating is less compact and less adherent to the coated article than where molecules are deposited from a solution. A further disadvantage of the disclosed composition is that the ratio of pigment to resin must be maintained at about 1:2.5 to 1:6.0 in order to operate satisfactorily. Moreover, in this process voltages of 500 to 5,000 volts are necessary, with resultant danger and high temperatures being a problem.

SUMMARY OF THE INVENTION

In accordance with this invention, it has been found that the foregoing difficulties may be overcome so that exposed portions of metal can be uniformly and consistently satisfactorily coated or flaws in previously applied coatings repaired, by the electrophoretic deposition at low voltages both on clean metal and on the exposed metal flaws of coated members to which an insulating coating using a composition consisting of a resin dissolved in an organic solvent comprising a liquid nitroalkane substantially free from water, and in which an inorganic filler may be suspended, having the property of low withdrawal of the deposited resinous coating from irregular, sharp metallic surface areas during the drying and curing period following the application of the coating. Wetting agents and surfactants are added to the resinous coating compositions in order to improve the deposition and to slow down the withdrawal action of the deposited resin from certain corner and edge areas of the metal surface, while the coating is in the uncured state.

Briefly, the present invention includes a coating composition for the electrodeposition of electrical insulating coatings on a conductive base material, such as a metallic substrate, the coating suspension comprising a non-aqueous liquid organic solvent comprising as an essential component a liquid nitroalkane of a high dielectric constant above about 10, and a low viscosity, a heat hardenable resin dissolved in the solvent, one or more surface active agents, and from about 1 to 10 percent by weight of a finely divided inorganic filler material suspended in the solution, the filler being less than 50 percent of the weight of the resin.

The invention also includes a method of electrophoretic deposition of an electrically insulating coating on a metallic substrate comprising the steps of preparing the ingredients of a composition which comprises a coating solution including a non-aqueous solvent of a high dielectric constant and a low viscosity and having dissolved therein a heat hardenable resin, up to about 10 weight percent of a finely divided inorganic filler suspension in the solution, and one or more surface active agents, placing the composition of ingredients in an electrophoretic deposition cell, placing the metal substrate to be coated in the compositions and making it the negative electrode, a piece of metal such as copper, brass or platinum being the positive electrode, passing a direct current at a low voltage through the cell at a current density of the order of 0.1 to 1.0 ma/cm² and for a sufficient time (usually from 1 to 2 minutes being adequate) to cause a composite coating of the resin and the filler, if any is present, to be deposited, on the exposed areas of the substrate, and heat curing the resinous coating upon removal of the coated component from the cell.

DESCRIPTION OF THE DRAWINGS

For a better understanding of the nature and objects of this invention, reference is made to the drawings in which.

DESCRIPTION OF THE PREFERRED EMBODIMENTS

Figure 1:
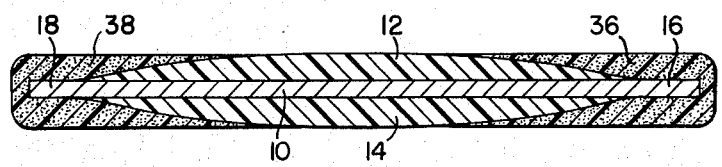
FIG. 1 is a transverse sectional view of a metal foil having an original insulation coating which has retracted from the opposite edge portions of the foil leaving the edge portions exposed as occurs in the prior art, and having a second coating applied to the exposed edge portions.

In the past, the application and maintenance of insulation coatings on metal foil and wire have presented problems which were not readily remedied in an inexpensive manner. Typical problems are shown in the several figures of the drawings. In FIG. 1, a section of metal foil 10, such as aluminum foil, is provided with an original coating 12 and 14 applied for example by dipping, on opposite sides thereof. The coatings 12 and 14 in the past were composed of an organic or inorganic material having a low viscosity and high surface tension. The coatings frequently retracted from the edge portions 16 and 18 of the foil 10 leaving such edge portions barely coated or even being uncoated and exposed to the atmosphere.

In a similar manner, a section of metal wire 20 (FIG. 2) having an irregularity or sliver 22 or surface dirt particles 23 is provided with an enamel dip coating 24 which during the application and customary drying or curing of the coating composition retracted to a hardened condition generally indicated by the broken line 26 whereby the outer extremity of the metal sliver 22 is exposed to the atmosphere and could result in electrical failure of an electrical device using it. At the particle 23 the enamel is extremely thin and has low dielectric strength as well as possible cracking on the wire being flexed or elongated in application or use.

Figure 4:
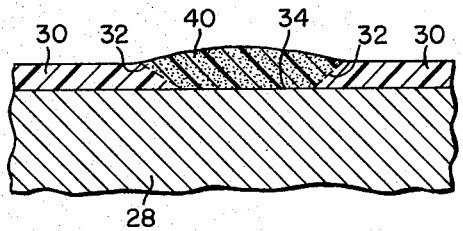
FIG. 4 is an enlarged, fragmentary, longitudinal sectional view of a section of enameled wire and showing the manner in which an original insulation coating which has been abraded to expose a portion of the wire may be repaired in accordance with the procedure of the present invention.

Electrical components are inadvertently damaged as shown in FIG. 4 in which a metal wire 28 is provided with a coating 30 of dielectric material. It frequently happens during the formation of a coated wire such as in the preparation of coils for motors that the wire enamel becomes abraded or chipped as indicated by the broken line 32 (FIG. 4) whereby a portion 34 of the wire 28 is uninsulated and is exposed to the atmosphere whereby electrical failure can occur.

The foregoing defects may be overcame by the subsequent application of another coating by the electrophoresis methods of this invention. Thus, the end portions 16 and 18 of the foil 10 (FIG. 1) may be subsequently covered with coatings 36 and 38 which cover edges and corners extremely well and form a complete seal at their interfaces with the original coatings 12 and 14.

Figure 2:
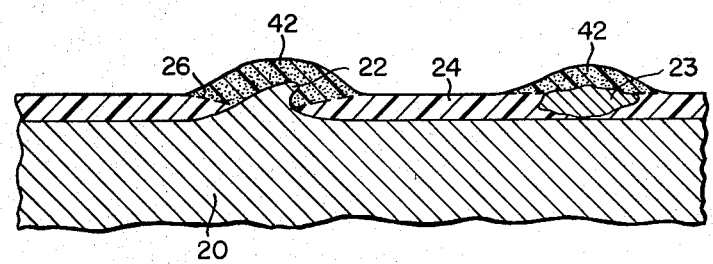
FIG. 2 is an enlarged, fragmentary, longitudinal sectional view of a section of wire showing the manner in which an original dip insulation coating which has withdrawn from a sliver or oxide particle on the surface of the wire may be repaired in accordance with the procedure of the present invention.

Likewise, the abraded portion of the coating 30 of the wire 28 (FIG. 4) may be covered by the electrophoretic application of a coating 40 which completely covers the exposed wire surface 34 and an overlapping portion of the coating 30. Moreover, as shown in FIG. 2, the exposed sliver 22 of the wire 20 may have a coating 42 applied by the electrophoresis techniques of this invention so as to cover the exposed wire portion as well as the adjacent portions of the coating 24.

Figure 3:
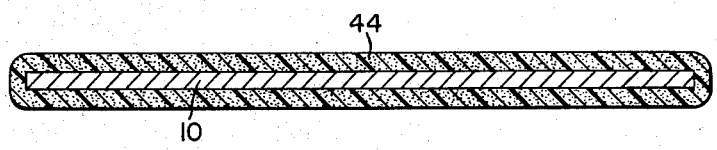
FIG. 3 is a transverse sectional view of a metal foil having a resinous composite coating uniformly disposed thereon.

In order to avoid the problem of withdrawal of a coating such as shown by the coatings 12 and 14 in FIG. 1, whereby the edge portions 16 and 18 are exposed, the clean metal foil 10 (FIG. 3) may be originally covered by the electrophoretic deposition processes of this invention with a coating 44 the composition of which is such that, using the processes disclosed herein, it will not retract or withdraw from the edge portions due to surface tension or similar properties in the manner shown in FIG. 1, and is uniformly thick and in fact may be slightly heavier on corners and edges. In other words, the coating 44 when applied is coextensive with and covers all surfaces of the metal foil 10. In a similar manner, the coatings 40 (FIG. 4) and coating 42 (FIG. 2) are preferably an electrophoretically applied resin composed of a material similar to that of the coating 44. The coatings 40, 42, and 44 when once applied and cured adhere and remain in place.

In accordance with this invention, the several coatings 36, 44, 40 and 42 are preferably applied by electrophoretic deposition by which complete or partial coatings may be applied to metal surfaces such as metal foil conductors, metal wire and other electrical metal components or conductive substrates. Generally, the electrophoretic method consists of placing the object to be coated into an electrophoretic deposition cell which has previously been filled with a novel composition comprising a solution embodying liquid nitroalkanes containing a heat hardenable resin fully dissolved therein and surfactants, and up to 10 percent by weight of an inorganic filler. A current is passed through the cell at a low voltage ordinarily below 200 volts and at sufficient current density and for a brief time to cause deposition of a desired thickness of coating of the resin and any filler to a thickness of up to 4 mils upon the exposed metal surfaces. Thereafter, the deposited resinous coating material is cured to the desired final state.

An electrophoretic composition suitable for use in practicing this invention includes an essentially anhydrous organic solvent, a resin, surfactants, and filler. A necessary component of the solvents are anhydrous liquid nitroalkanes, or mixtures thereof.

The liquid nitroalkyl or nitroalkane compounds, and mixtures with each other having up to about six carbon atoms, have been found to possess unexpected properties in the process of this invention. In particular these nitroalkyls with not over six carbon atoms are suitably low viscosity liquids, have a boiling point not materially above about 170° C and are particularly useful in the electrophoretic process for obtaining a compact and tightly adherent coating. The nitroalkanes have the added advantage of being readily obtainable and maintanable in non-aqueous condition and are sufficiently polar and close enough to water in certain desirable properties, such as fast evaporation, to function like water without having the disadvantages of water. Even small amounts of water, for example ¼ percent by weight, results in degraded processing controls and inferior coatings.

Moreover, the nitroalkanes, as solvents, are relatively highly conductive or polar which enhances the overall control of the resulting coating. Excellent results have been had with a solvent composed of at least one of the nitroalkyl organic liquids as for example, nitroethane, nitromethane, 1-nitropropane, 2-nitropropane, and mixtures thereof in an amount ranging from about 30 to 65 weight percent, the preferred amount of solvent being about 43 percent.

The resin is a non-aqueous organic solvent solution of a heat hardenable polymer such as solvent soluble polyimide precursor resins, as for example, set forth in U.S. Pat. Nos. 3,179,614, 3,179,633 and 3,179,634, polyamide-imide resins (U.S. Pat. No. 3,179,635) polyester resins including oil-modified polyesters and oil modified alkyls admixed with phenolic resins, epoxy and polyurethane resins. The amount of resin solids in the electrophoretic composition may range from about 10 percent to about 30 percent by weight a preferred amount being from about 18 to 20 percent for the above identified amount of nitro-alkyl solvent. The amount of the original resin solvent which may, for example, be toluene, benzene, xylene and other hydrocarbon solvents, alcohols such as butanol, esters such as alkyl acetates and mixtures of two or more, being sure no water is present, may be of the order of 15 percent to 35 percent of the total weight of the electrophoretic composition.

The surfactant may be non-ionic or anionic and functions as a wetting agent; exemplary compounds are sodium dioctyl sulfosuccinate and sodium alkyl sulfate. Numerous other wetting agents are well known and may be employed. Sodium salts of sulfated fatty alcohols are satisfactory anionic surfactants. As available commercially this type of anionic surfactant is usually a mixture of the sodium salts of sulfated fatty alcohols made by reducing the mixed fatty acids of coconut oil, of palm kernel oil, of cottonseed oil, and of fish or sperm oils. Sometimes natural waxes such as spermaceti, wool fat, and beeswax are sulfated directly. The mixture of the sulfated fatty alcohols, which is known commercially as "lauryl alcohol" comprises about 15 percent mixed $C_8$ and $C_{10}$ (octyl and decyl) alcohols, 40 percent $C_{12}$ (lauryl or dodecyl) alcohol, 30 percent $C_{14}$ (myristyl or tetradecyl) alcohol, and 15 percent mixed $C_{16}$ and $C_{18}$ (cetyl, stearyl and oleyl) alcohols. However individual sodium salts of sulfated fatty alcohols are contemplated and include sodium lauryl sulfate, sodium octyl sulfate, sodium decyl sulfate, sodium dodecyl sulfate, sodium myristyl sulfate, sodium cetyl sulfate, sodium stearyl sulfate and sodium oleyl sulfate.

Also useable are the alkyl or alkane sulfonates and the sodium salts of sulfonated higher fatty acids such as those found in coconut oil, palm oil, olive oil and the like. This will give rise to sodium salts of sulfonated mixed higher fatty acids, although the sodium salts of the sulfonated individual acids can be employed. Esters of sulpho fatty acids can also be employed. Likewise amides of the foregoing, such as sulfonated coconut oil fatty acid amide can be used.

Useable alkyl aryl sulfonates available commercially are one or more sodium salts of alkyl (either short or long chain, usually the latter), benzene or napthalene sulfonic acids. The alkyl can be the lower alkyl, such as methyl, ethyl, propyl, isopropyl, butyl, or it can be and is usually, a higher alkyl having from 8 to 18 carbon atoms such for example as octyl, nonyl, decyl, dodecyl, tetradecyl and keryl.

These higher alkyls can be derived from the fatty acids of coconut oil, palm oil and olive oil, or from a hydrocarbon kerosene fraction containing predominantly 12 carbon atoms to the molecule. Specifically, it may be mentioned the sodium salt of the sulphonic acid derived from condensing benzene with a chlorinated kerosene fraction of this nature (keryl chloride). Also may be mentioned sodium isopropylnaphthalene sulfonate, sodium butyl naphthalene sulfonate, sodium keryl benzene sulfonate and sodium dodecyl benzene sulfonate.

Non-ionic wetting agents found useful are generally compounds prepared by reacting a hydrophobic hydroxy compound (either a phenol or an alcohol) with several mols of ethylene (or propylene) oxide. Similar non-ionic wetting agents are prepared by reacting ethylene or propylene oxide with fatty acids or by esterifying polyethylene glycol with a fatty acid. Also, non-ionic wetting agents can be prepared by reacting a hydroxy ester or hydroxyamide of a fatty acid with ethylene oxide to form a polyethylene ether. Fatty amids and hydrophobic sulfonamides have also been reacted with ethylene oxide. In addition there is a series of fatty acid esters of anhydrosorbitols which have been solubilized by etherifying the free hydroxyl groups with ethylene oxide.

Satisfactory results have been obtained with sodium dioctyl sulfosuccinate in an amount ranging from about 0.3 percent to 1.0 percent. For good results the sodium alkyl sulfate may be used in an amount ranging from about 5 percent to 15 percent. The preferred amount of sulfosuccinate is about 0.5 percent and of sulfate is about 10 percent.

Certain beneficial results flow from the addition of solid fillers. The function of the fillers is (1) to be driven into and, in combination with the resins to fill in the flaws of the insulation coating on a wire or foil, and (2) reduce or eliminate any tendency for the withdrawal of the deposited coating film from the exposed metal. The withdrawal phenomenon is caused by the heightened surface tension effects while the resin is being cured. The fillers comprise an electrically insulating inorganic material for electrical insulating application. The average particle size should not be over the order of 0.5 to 10 microns. Examples of suitable fillers are silicon dioxide, boric oxide mica, hydrated alumina, and levigated alumina, either individually or as mixtures. The fillers must be finely divided, with the particle size of $SiO_2$, for example, being not over the order of 0.5 micron, of boron anhydride being not over about 10 microns, of mica being less than 5 microns, and of the aluminas (both kinds) being not over about 1 micron. The filler may be added in an amount ranging from about 1 percent to 20 percent of the weight of resin, depending upon the type of filler and the purpose for it.

The metal component to be coated such as the aluminum foil 10 or the wire 20 and 28 (in the form of coils or other semi-finished shape) is placed in the cell and a lead is attached to make it an electrode to which the charged molecules of resin and the particles of filler are attracted. Voltages of from 40 to 200 volts are applied from a graphite or platinum cathode. The charged filler particles are incorporated in the resinous coating since both are deposited simultaneously on the metal. In general, the charge on the particles is negative and the member to be coated is made the anode. The resin-filler film is particularly stable before and during curing, so that there is no withdrawal or loosening of the film from the edges of the coated aluminum foil.

The following examples are illustrative of the present invention.

EXAMPLE I

The test samples used were 7.5 × 8.5 centimeter sections cut off from a coil of aluminum foil conductor 2 mils thick, which foil had been coated with a 39 percent solid solution in a heavy naphtha solvent of an oil modified polyester wire enamel. The average thickness of the enamel was 0.2 mil. The samples were then deliberately flawed by spark etching at $10\mu a$, $100\mu a$, and 1 ma, at 350, 500, and 700 volts. The three damaged enameled foils were then electrocoated at 0.17, 0.39, and 0.78 ma per $cm^2$, at voltages of from 40 to 135 volts for 0.5 to 1 minute, respectively, then the applied coating was cured by heating for 0.5 minute at 340° C. The insulation thickness was measured before and after the electrodeposition as indicated in the attached Table. The electrodeposition solution consisted of about 1.5 percent by weight of less than 5 micron size mica, 43.5 percent by weight of a 39 percent solids solution in a heavy naphtha solvent of an oil modified polyester enamel, 43.5 percent of practical grade anhydrous (previously dried over $CaSo_4$) nitroethane, about 0.5 percent of sodium dioctyl sulfosuccinate, and of 11 percent non-ionic sodium alkyl sulfate which was added to the composition containing finely divided mica. The sodium dioctyl sulfosuccinate and the sodium alkyl sulfate benefit the charging of the particles, in addition to imparting favorable wetting properties to the aluminum-solution interface.

The electric breakdown strength after electrocoating and curing of the applied resin coating was measured in the center of the pieces, over the spark-etched flaws, and over both edges, using a ¾ inch brass electrode with the sample connected to provide a complete circuit. Thus, the electric breakdown strength testing was accomplished through only one side of the healed insulating film. The test sensitivity was set at 10 microamperes. The average film thickness was about 0.5 mil and the test specification was set at 500 volts, 10 microamps ($\mu a$) at 0.5 mil. In some cases, two test pieces were placed at right angles to each other, forming a cross, with 4 ounces weight pressing down on the intersecting corners, and the electric strength was measured from foil to foil. The test results are shown in the table.

similar to those of Example I. A test coating of about 0.5 mil thickness was applied at from about 120 to 128 volts and cured for 1 minute at 300° C. The aluminum foil edges were TABLE I.—DIELECTRIC STRENGTH OF ELECTROPHORETICALLY HEALED INSULATED Al FOIL

| Spark etch B.D. of original sample | Build after depos.,* avg. mils | | Electric breakdown after electrodeposition, volts | | | | Elect. depos. parameters | | |
|---|---|---|---|---|---|---|---|---|---|
| | Edge*** | Center | Edge 1 | Edge 2 | Center | Position over previous breakdown | J., ma./cm.² | Time, min. | Cure at 340/ C., min. |
| 350 volts, 1 ma.: | | | | | | | | | |
| 1 | 3.5 | 2.9 | 400 | 480 | 860 | * 1,000 | 0.17 | 1 | 0.5 |
| 2 | 3.1 | 3.0 | 760 | 370 | * 1,000 | * 1,000 | 0.39 | 1 | 0.5 |
| 3 | 2.9 | 2.9 | 520 | 580 | * 1,000 | 680 | 0.78 | 0.5 | 0.5 |
| 350 volts, 100 μa.: | | | | | | | | | |
| 1 | 3.4 | 2.8 | 580 | 620 | * 1,000 | * 1,000 | 0.39 | 1 | 0.5 |
| 2 | 2.8 | 3.0 | 320 | 400 | * 1,000 | 980 | 0.17 | 1 | 0.5 |
| 3 | 3.2 | 3.1 | 440 | 62 | * 1,000 | * 1,000 | 0.78 | 0.5 | 0.5 |
| 350 volts, 10 μa.: | | | | | | | | | |
| 1 | 2.8 | 2.8 | 680 | 540 | * 1,000 | 640 | 0.39 | 1 | 0.5 |
| 2 | 3.2 | 2.9 | 320 | 400 | 820 | * 1,000 | 0.17 | 1 | 0.5 |
| 3 | 2.8 | 2.8 | | | | | 0.78 | 0.5 | 0.5 |
| 500 volts, 10 μa.: | | | | | | | | | |
| 1 | 2.9 | 2.7 | 460 | 260 | 860 | * 860 | 0.78 | 2 | 2 |
| 2 | 2.9 | 2.7 | 360 | 460 | * 1,000 | 780 | 0.39 | 1 | 1 |
| 3 | 2.9 | 2.7 | 510 | 500 | * 1,000 | * 1,000 | 0.17 | 1 | 0.5 |
| 500 volts, 100 μa.: | | | | | | | | | |
| 1 | 2.8 | 2.5 | 660 | 400 | * 1,000 | 700 | 0.17 | 1 | 0.5 |
| 2 | 3.6 | 2.7 | 760 | 380 | 560 | 660 | 0.17 | 2 | 0.5 |
| 3 | 3.1 | 2.7 | 450 | 400 | 1,000 | * 1,000 | 0.38 | 1 | 0.5 |
| 500 volts, 1 ma.: | | | | | | | | | |
| 1 | 3.0 | 2.8 | 400 | 340 | * 1,000 | * 1,000 | 0.39 | 1 | 0.5 |
| 2 | 2.9 | 2.9 | 400 | 220 | * 1,000 | * 1,000 | 0.39 | 0.5 | 0.5 |
| 3 | 2.9 | 2.9 | 380 | 400 | * 1,000 | 940 | 0.17 | 1 | 0.5 |
| 700 volts, 10 μa.: | | | | | | | | | |
| 1 | 3.0 | 2.8 | 360 | 52 | 960 | 1,000 | 0.17 | 1 | 0.5 |
| 2 | 3.5 | 3.0 | 680 | 600 | * 1,000 | * 1,000 | 0.39 | 1 | 0.5 |
| 3 | 3.2 | 2.8 | 560 | 660 | * 1,000 | 960 | 0.70 | 0.5 | 0.5 |
| 700 volts, 100 μa.: | | | | | | | | | |
| 1 | | | | | | | 0.17 | 1 | 0.5 |
| 2 | 3.3 | 3.0 | 600 | 600 | * 1,000 | * 1,000 | 0.39 | 1 | 0.5 |
| 3 | 3.3 | 3.1 | 480 | 380 | * 1,000 | * 1,000 | 0.78 | 0.5 | 0.5 |
| 700 volts, 1 ma.: | | | | | | | | | |
| 1 | 2.9 | 2.8 | 440 | 400 | 980 | * 1,000 | 0.17 | 1 | 0.5 |
| 2 | 3.3 | 2.9 | 620 | 240 | 700 | * 1,000 | 0.39 | 1 | 0.5 |
| 3 | 3.2 | 2.8 | 480 | 200 | 900 | 600 | 0.78 | 0.5 | 0.5 |

* Indicates samples that did not breakdown.
** Thickness of coated, spark-etched foil as received. Avg., 2.2 mils.
*** Measuring edge thickness was made difficult by wrinkles.

The table summarizes the electric strength results obtained after electrophoretic healing. The results show that previously flawed and electrophoretically coated foil sections exhibited electric strength ranging from a minimum of 640 volts to more than 1,000 volts with no breakdown. The strength values obtained at the edges indicate that the electrophoretic healing treatment resulted in the coverage of the poorly insulated edges of the foil with breakdown values of the order of about 500 volts. Where two foil sections were tested in a crossed position with weights on the intersecting edges, values of at least 500 volts were obtained. By contrast, in the absence of electrocoating healing, one or more ordinary dip-coats of the same composition succeed in healing consistently only the flaws obtained at 10 microamperes at 350-700 volts.

The current density range ordinarily useful for this type of electrodeposition may extend from 0.1 to 2 ma per cm².

EXAMPLE II

In a manner substantially similar to that of Example I, test samples were placed in an electrodeposition solution consisting of 10 grams of mica, 200 grams of polyimide resin polyamic acid precursor (such as disclosed in U.S. Pat. No. 3,179,634), 200 cc of nitroethane, 2 grams of sodium dioctyl sulfosuccinate, and from 50 to 100 cc of sodium alkyl sulfate. The average film thickness was about 0.5 mil which was applied at 1 ma, at a voltage of from 125 to 165 volts, for a period of 5 minutes. Each sample was cured for 2 minutes at 300° C. The aluminum foil edges were coated satisfactorily.

EXAMPLE III

Other samples were electrodeposited in a solution containing 400 grams of an oil modified phenolic alkyd resin (U.S. Pat. No. 25,213, issued July 31, 1962), 400 cc of nitroethane, 4 grams of sodium dioctyl sulfosuccinate, and 100 cc of sodium alkyl sulfate. No pigment, such as mica, was added. Otherwise the deposition and testing procedures were substantially well coated.

Wire, coils and other members having no sharp edges can be very successfully electrophoretically coated with the nitroalkyl solutions of heat hardenable resins without any filler.

Mixtures of the nitroalkyls also can be employed. Thus, in the above examples, a mixture of equal volumes of nitromethane and nitropropane can be substituted for the nitroethane with equally good results.

Moreover, the voltages used may vary from about 30 to 175 volts for 5 minute exposures at 2 ma/cm² current density. Ordinarily the voltage used was from about 62 to 140 volts for from 1 to 2 minute exposures to apply a 2 to 4 mils coating thickness of resin and filler with the coating at the edges of the sheet being slightly thicker (about 0.1 to 0.2 mil) than the center of the sheet.

The important feature of this invention is the fact that at relatively low voltages of below 200 volts, good electrophoretic deposition of resinous coatings can be applied to members. This avoids not only the electrical hazards of high voltages such as have been used in the prior art, but less heating of the electrophoretic composition occurs, reducing fire and other obvious hazards. Short time electrophoretic deposition applies a fully adequate 1 to 4 mil thick resinous coatings on members.

In summary, low voltage, non-aqueous systems for applying resin coatings containing inorganic fillers can be used for a number of purposes. Electrical defects in insulation of semifinished equipment may be corrected such as insulated wire discovered to be defective after being wound on a motor. In a similar manner, such defects may be corrected in insulated aluminum foil conductors for transformers. Moreover, insulation coatings on foil conductors may be extended continuously around the edges of metal foil as for example after slitting enamel foil. An advantage of the process is that expensive electrical components may be saved from being scrapped by the electrophoretic application of insulation coatings. Accordingly, it is apparent that the present invention solves a long existing problem in the art of correcting electrical flaws in the insulation of electrical components such as copper wire coils and insulated aluminum foil.

It should be understood that copper wire, foils and other electrical conductors, metallic or non-metallic, may be provided with an initial highly reliable, thin insulating coating by practice of the present invention.

It is understood that the above specification and drawings are merely exemplary and not in limitation of the invention.

What is claimed is:

1. A coating composition for the electrophoretic deposition of electrical insulating coatings on a conductive base material, the composition being substantially anhydrous and comprising about 1 to 20 weight percent of a finely divided electrically insulating inorganic filler material having an average particle size of 0.5 to 10 microns, from about 30 to 65 percent of a liquid non-aqueous nitroalkyl solvent having one to six carbon atoms, a dielectric constant of at least about 10, and a low viscosity, about 10 percent to about 30 percent by weight of a heat hardenable resin dissolved in the nitroalkyl solvent, and a small amount of at least one non-ionic surfactant, said heat hardenable resin being selected from the group consisting of polyamide resins, polyamide-imide resins, polyester resins, oil-modified polyester resins, and mixtures thereof.

2. The coating composition of claim 1, wherein up to 10 parts by weight of the finely divided electrically insulating material is selected from at least one of a group consisting of hydrated alumina, mica, silicon dioxide, boron oxide, and aluminum oxide.

3. The coating composition of claim 1, in which the filler consists of about 2 percent of finely divided mica.

4. The coating composition of claim 1 which includes 15 percent to 35 percent of a solvent for said resin.

5. The coating composition of claim 1 wherein any water present is less than ¼ percent by weight.

* * * * *